(12) United States Patent
Marsh et al.

(10) Patent No.: US 7,277,811 B1
(45) Date of Patent: Oct. 2, 2007

(54) CALIBRATION APPARATUS AND PROCESS

(75) Inventors: Bobby J. Marsh, Lake Stevens, WA (US); Steven H. Nichols, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/432,011

(22) Filed: May 11, 2006

(51) Int. Cl.
*G01L 25/00* (2006.01)
*G01C 21/00* (2006.01)

(52) U.S. Cl. .......................... 702/105; 702/94; 702/95

(58) Field of Classification Search ................. 702/94, 702/95, 105, 150–154
See application file for complete search history.

(56) References Cited

U.S. PATENT DOCUMENTS

| | | | |
|---|---|---|---|
| 4,383,762 A | 5/1983 | Burkert | 356/455 |
| 4,714,339 A | 12/1987 | Lau et al. | 356/4.09 |
| 4,929,082 A | 5/1990 | Webber | 356/498 |
| 5,083,866 A | 1/1992 | Dey | 356/508 |
| 5,861,956 A | 1/1999 | Bridges et al. | 356/614 |
| 5,900,938 A | 5/1999 | Huang | 356/508 |
| 6,392,222 B1 | 5/2002 | Greenwood | 250/221 |
| 6,420,694 B1 | 7/2002 | Greenwood | 250/221 |
| 6,611,141 B1 * | 8/2003 | Schulz et al. | 324/226 |
| 6,615,102 B1 | 9/2003 | Morfino | 700/173 |
| 6,640,607 B2 | 11/2003 | Abbe | 73/1.01 |
| 6,775,013 B2 | 8/2004 | Wang | 356/614 |
| 6,909,517 B2 | 6/2005 | Coleman et al. | 356/620 |
| 6,918,188 B2 | 7/2005 | McMurtry | 33/558.2 |
| 2004/0036867 A1 * | 2/2004 | Jedamzik et al. | 356/243.1 |
| 2004/0136012 A1 * | 7/2004 | Kyle et al. | 356/614 |

FOREIGN PATENT DOCUMENTS

| | | | |
|---|---|---|---|
| EP | 2005/108020 | * | 11/2005 |
| WO | 93/08449 | | 4/1993 |
| WO | 00/03312 | | 1/2000 |

OTHER PUBLICATIONS

Wang, Charles, A New Laser non-contact Method for the Measurement of Spindle Error Motion, (pp. 1-13) dated Jun. 18-19, 2001.

* cited by examiner

*Primary Examiner*—Michael Nghiem
(74) *Attorney, Agent, or Firm*—Timothy K. Klintworth; Wildman, Harrold, Allen & Dixon, LLP (57) ABSTRACT

The invention discloses differing embodiments of calibration apparatus, and methods of use. In one embodiment, the calibration apparatus may be used to calibrate a tool, positioning system, robot, machine, or device. The calibration apparatus may include a first member adapted to be attached to a tool, positioning system, robot, machine, or device, and two or more reflectors attached to the first member. The reflectors may be adapted to reflect one or more laser beams emitted from a laser tracker system. In such manner, a laser tracker system may be used to determine spatial X, Y, and Z coordinates of the reflectors, and/or to determine angular orientation of the first member. Using the spatial X, Y, and Z coordinate and angular orientation data, a tool, positioning system, robot, machine, or device may be calibrated.

57 Claims, 4 Drawing Sheets

CALIBRATION APPARATUS AND PROCESS

BACKGROUND OF THE INVENTION

There are a variety of calibration apparatus known in the art for calibrating tools, positioning systems, robots, machines, or other devices. Many of these apparatus experience one or more problems, such as inaccuracy, timeliness, cost, repeatability, failure, and/or ease of use, amongst additional problems.

A calibration apparatus, and method for its use, is needed which may solve one or more problems in calibrating tools, positioning systems, robots, machines, or other devices.

SUMMARY OF THE INVENTION

In one aspect of the invention, a calibration apparatus for calibrating at least one of a tool, positioning system, robot, machine, and device is provided. The calibration apparatus comprises a first member adapted to be attached to at least one of a tool, positioning system, robot, machine, and device, and at least two reflectors attached to the first member. The reflectors are adapted to reflect one or more laser beams emitted from a laser tracker system to allow the laser tracker system to determine spatial X, Y, and Z coordinates of the reflectors, and to determine angular orientation of the first member.

In another aspect of the invention, a method is disclosed for determining the spatial location and orientation of at least one of a tool, positioning system, robot, machine, and device. The method comprises providing a calibration apparatus having at least two reflectors in known positions. The calibration apparatus is attached to at least one of a tool, positioning system, robot, machine, and device. A laser tracking system is used to determine spatial X, Y, and Z coordinates of the reflectors. The spatial X, Y, and Z coordinates of the reflectors are used to determine angular orientation of the calibration apparatus. A determination is made as to the spatial location and orientation of the tool, positioning system, robot, machine, or device based on the determined spatial X, Y, and Z coordinates of the reflectors and the determined angular orientation of the calibration apparatus.

In a further aspect of the invention, a method is disclosed for determining at least one of the spatial location and orientation of at least one of a tool, positioning system, robot, machine, and device. A calibration apparatus is provided having at least two reflectors in known positions. The calibration apparatus is attached to at least one of a tool, positioning system, robot, machine, and device. The tool, positioning system, robot, machine, or device is moved to a first predetermined location. One or more laser beams are emitted from a laser tracking system towards the first predetermined location. At least one of the spatial location and orientation of the calibration apparatus is determined in the first predetermined location. A determination is made as to at least one of the spatial location and orientation of the tool, positioning system, robot, machine, or device based on the at least one determined spatial location and orientation of the calibration apparatus in the first predetermined location.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
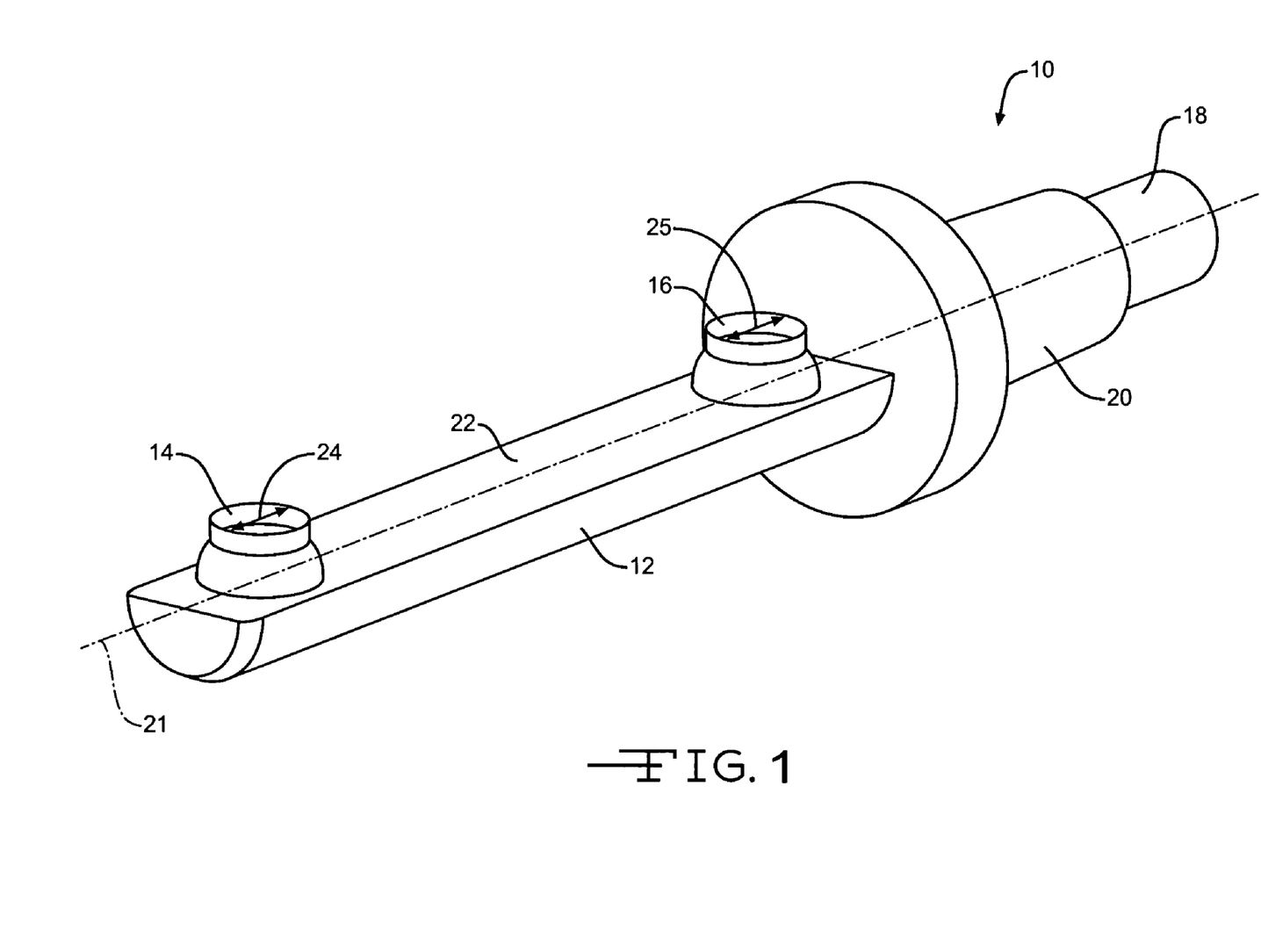
FIG. 1 is a perspective view of one embodiment of a calibrating apparatus under the invention.

In one embodiment of the invention, as shown in FIG. 1, a calibration apparatus 10 is provided. The calibration apparatus 10 may be utilized to calibrate a tool, positioning system, robot, machine, or device used in aeronautical or non-aeronautical manufacturing applications. For example, the calibration apparatus 10 may be utilized to calibrate the spindle of a milling machine. In other embodiments, the calibration apparatus 10 may be used to calibrate other devices known in the art. The calibration apparatus 10 may comprise a first member 12, and two reflectors 14 and 16 attached to the first member 12. The reflectors 14 and 16 may be in known positions with respect to member 12. In other embodiments, the calibration apparatus 10, including member 12 and reflectors 14 and 16, may be in a variety of shapes, sizes, orientations, and configurations.

The first member 12 may comprise a steel sine bar tool. In other embodiments, the first member 12 may be made of varying materials, such as Invar, composite material, aluminum, or any stable material. The first member 12 may be adapted to be attached to a tool, positioning system, robot, machine, or device. For instance, the first member 12 may have two indexing diameters 18 and 20 which are adapted to be attached to a tool, positioning system, robot, machine, or device. The indexing diameters 18 and 20 may be generally cylindrical, and may comprise differing sized diameters. In other embodiments, the first member 12 may be configured in varying ways to allow differing methods of attachment to a tool, positioning system, robot, machine, or device.

The reflectors 14 and 16 may be spaced substantially in the range of eight to twelve inches apart from each other and attached to a center-line 21 of a substantially linear section 22 of the first member 12. In other embodiments, the reflectors 14 and 16 may be attached to any portion of the calibration apparatus 10. The reflectors 14 and 16 may be substantially spherical or hemi-spherical, and may comprise one or more mirrors in varying shapes, orientations, sizes, and configurations. Diameters 24 and 25 of the reflectors 14 and 16 may be in substantially in the range of one-half to two inches. The reflectors 14 and 16 may be attached to the linear section 22 of the first member 12 utilizing one or more magnets (not shown). In other embodiments, varying mechanisms and methods known in the art may be utilized to attach the reflectors 14 and 16 to any portion of the calibration apparatus 10, such as snap-fits, bolts, and other devices.

Figure 2:
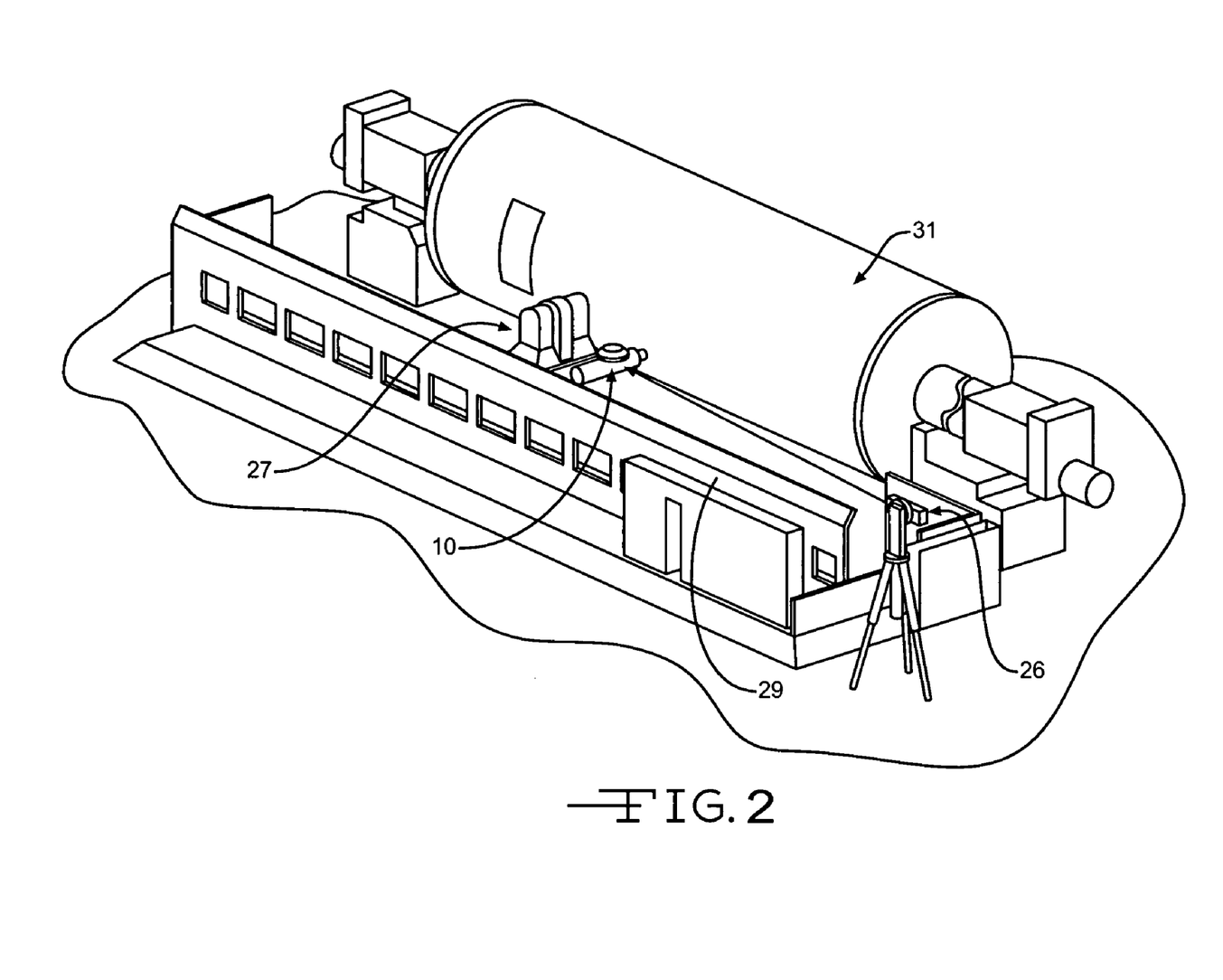
FIG. 2 depicts a perspective view of the calibration apparatus of FIG. 1 installed on the spindle of a milling machine aligned with a barrel of an airplane.

FIG. 2 depicts the calibration apparatus 10 of FIG. 1 installed on the spindle of a milling machine 27. The milling machine 27 may transgress up and down track 29 in order to machine one or more holes in the barrel 31 of an airplane. As shown in FIGS. 1 and 2, the reflectors 14 and 16 of the calibration apparatus 10 may be adapted to reflect one or more laser beams emitted from a laser tracker system 26 to allow the laser tracker system 26 to determine spatial X, Y, and Z coordinates of the reflectors 14 and 16. The laser tracker system 26 may use the determined spatial X, Y, and Z coordinates of the reflectors 14 and 16 to determine the angular orientation of the first member 12. This determination may be made utilizing one or more computers. The laser tracker system 26 may also use the determined spatial X, Y, and Z coordinates of the reflectors 14 and 16, and/or the determined angular orientation of the first member 12 to determine the spatial X, Y, and Z coordinates and/or angular orientation of a portion of a tool, positioning system, robot, machine, or device to which the calibration apparatus 10 is attached, such as the spindle of milling machine 27. This determination may similarly be accomplished utilizing one or more computers. In such manner, the calibration apparatus 10 may be utilized to calibrate a tool, positioning system, robot, machine, or device to which the calibration apparatus 10 is attached, such as the spindle of milling machine 27.

Figure 3:
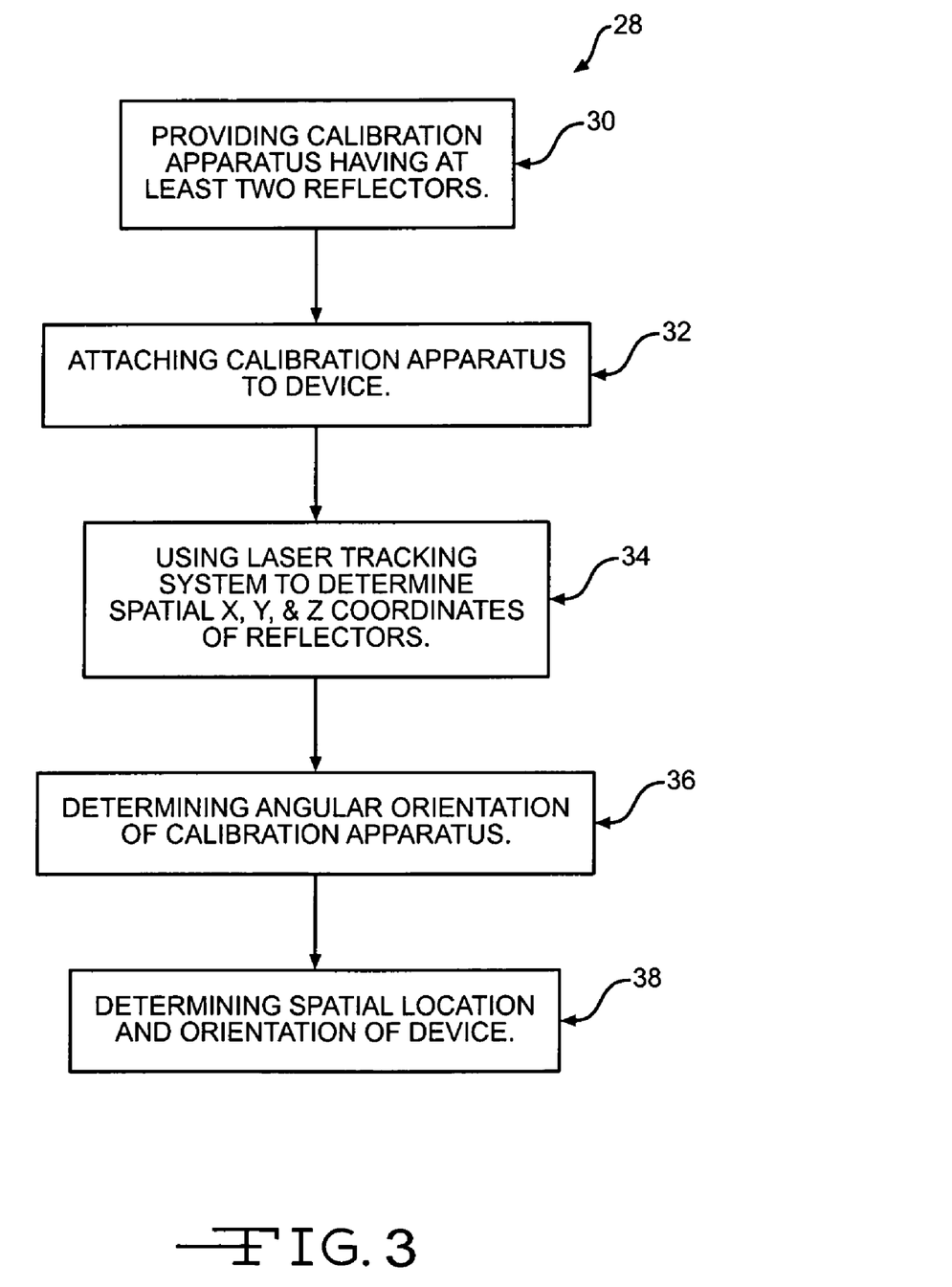
FIG. 3 depicts one embodiment of a method under the invention for determining the spatial location and orientation of a tool, positioning system, robot, machine, or other device.

In another embodiment of the invention, as shown in FIG. 3, a method 28 for determining the spatial location and orientation of a tool, positioning system, robot, machine, or other device is provided. In step 30, a calibration apparatus is provided having at least two reflectors in known positions. The provided calibration apparatus may comprise any of the embodiments disclosed within this specification. During step 32, the calibration apparatus is attached to a tool, positioning system, robot, machine, or other device. This may be accomplished by attaching one or more indexing diameters of the calibration apparatus to a portion of a tool, positioning system, robot, machine, or device. In other embodiments, varying attachment mechanisms known in the art may be utilized. During attachment, a center-line of the calibration apparatus may be aligned with a center-line of a portion of the tool, positioning system, robot, machine, or device. As an example, a center-line of the calibration apparatus may be aligned with a center-line of the spindle of a milling machine. In other embodiments, the calibration apparatus may be attached to an end effector, or moveable portion, of a tool, positioning system, robot, machine, or device. In one embodiment, a milling machine spindle may be programmed to load and attach the calibration apparatus to the milling machine using a tool changer.

In step 34, a laser tracking system is utilized to determine spatial X, Y, and Z coordinates of the reflectors. This may be accomplished by emitting one or more laser beams from the laser tracking system, reflecting the laser beams off the reflectors, and determining the spatial X, Y, and Z coordinates of the reflectors utilizing one or more computers. In step 36, the spatial X, Y, and Z coordinates of the reflectors is utilized to determine the angular orientation of the calibration apparatus. This may be achieved by utilizing one or more computers. In step 38, a determination is made as to the spatial location and/or orientation of the tool, positioning system, robot, machine, or device based on the determined spatial X, Y, and Z coordinates of the reflectors and/or the determined angular orientation of the calibration apparatus.

The method 28 may further comprise the steps of moving the tool, positioning system, robot, machine, or device into a plurality of positions, utilizing the laser tracking system to determine spatial X, Y, and Z coordinates of the reflectors in each of the positions, and utilizing the spatial X, Y, and Z coordinates of the reflectors in each of the positions to determine the angular orientation of the calibration apparatus in each respective position. One or more computers may direct the tool, positioning system, robot, machine, or device into pre-determined locations. The laser tracking system may be directed by one or more computers to emit one or more lasers into the pre-determined locations in order to track the positioning and/or orientation of the calibration apparatus. All of the computers may be interlinked to facilitate the process. In one embodiment, a milling machine, with a calibration apparatus attached to the spindle, may be moved into two or more positions, and a laser tracking system may determine the spatial coordinates and/or angular orientation of the calibration apparatus. A further step may comprise determining the spatial location and/or orientation of the tool, positioning system, robot, machine, or device in each of the plurality of positions based on the determined spatial X, Y, and Z coordinates of the reflectors in each of the positions and/or the determined angular orientation of the calibration apparatus in each respective position. For instance, in one embodiment, the spatial location and orientation of a milling machine's spindle may be determined based on spatial coordinate and angular orientation data regarding the attached calibration apparatus.

An additional step may comprise determining the spatial X, Y, and Z coordinates and/or angular orientation of an end effector of a tool, positioning system, robot, machine, or device utilizing either or both of the determined spatial X, Y, and Z coordinates of the reflectors and the determined angular orientation of the calibration apparatus. For instance, the calibration apparatus may be utilized to determine the spatial X, Y, and Z coordinates and/or angular orientation of the end effector of a milling machine, such as a milling machine's spindle, based on the determined spatial X, Y, and Z coordinates of the reflectors and/or on the determined angular orientation of the calibration apparatus. Yet another step may comprise readjusting the position and/or orientation of the end effector based on the determined spatial X, Y, and Z coordinates and/or angular orientation of the end effector. In such manner, if the calibration apparatus determines that the end effector is in the wrong position, configuration, or orientation, the end effector may be readjusted into the correct position. A further step may comprise using the readjusted end effector to machine one or more holes in one or more surfaces. The holes may be machined in a portion of an airplane or in a non-aeronautical application.

Figure 4:
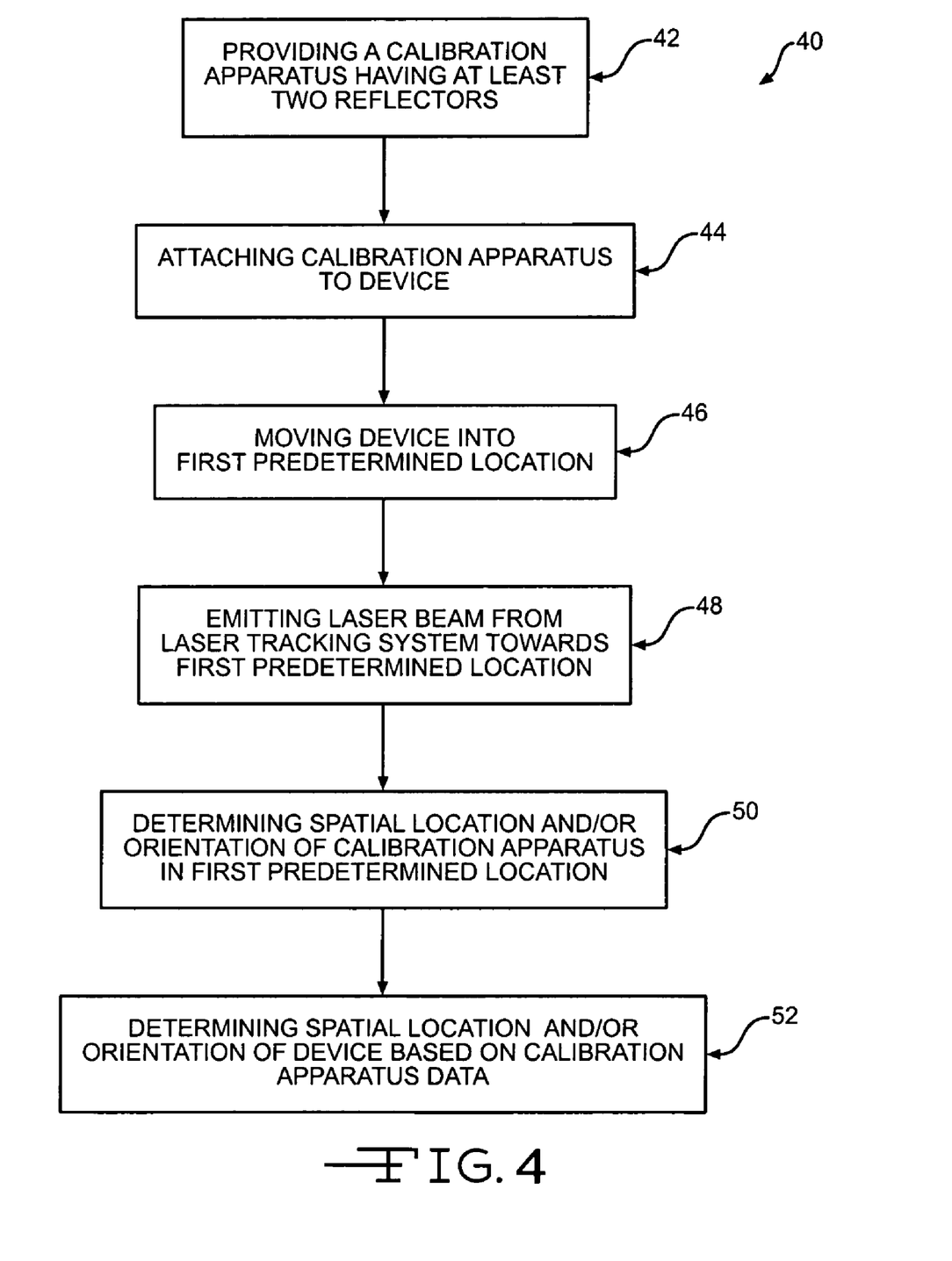
FIG. 4 depicts another embodiment of a method under the invention for determining the spatial location and/or orientation of a tool, positioning system, robot, machine, or device.

In yet another embodiment of the invention, as shown in FIG. 4, a method 40 for determining the spatial location and/or orientation of a tool, positioning system, robot, machine, or device is provided. In step 42, a calibration apparatus is provided having at least two reflectors in known positions. The provided calibration apparatus may comprise any of the embodiments disclosed within this specification. During step 44, the calibration apparatus is attached to the tool, positioning system, robot, machine, or device. The calibration apparatus may be attached utilizing snap-fits, bolts, or any mechanism known in the art. In step 46, the tool, positioning system, robot, machine, or device is moved into a first predetermined location. While in the first predetermined location, the tool, positioning system, robot, machine, or device may be calibrated.

During step 48, at least one laser beam is emitted from a laser tracking system towards the first predetermined location. One or more computers may be utilized to ensure that steps 46 and 48 take place interactively and/or simultaneously. For instance, a computer may be programmed to coordinate and direct the laser beam towards the first predetermined location when the tool, positioning system, robot, machine, or device is moved into the first predetermined location. In step 50, the spatial location and/or orientation of the calibration apparatus is determined in the first predetermined location. This may be accomplished utilizing one or more computers. During step 52, the spatial location and/or orientation of the tool, positioning system, robot, machine, or device is determined based on the determined spatial location and/or orientation of the calibration apparatus in the first predetermined location.

The method 40 may further comprise the step of placing a plurality of laser targets on or around various portions of a base surface upon which the tool, positioning system, robot, machine, or device is located. The targets may comprise any of the target embodiments disclosed in application Ser. No. 11/437,201, filed with the United States Patent Office on May 19, 2006, and entitled Combination Laser and Photogrammetry Target, which is hereby incorporated by reference. In other embodiments, any target known in the art may be utilized. In one embodiment, three targets may be located at the outer extremities of a base surface. In other embodiments, any number of targets may be located on any portion of the base surface. An additional step may comprise determining X, Y, and Z spatial positions of the targets utilizing the laser tracking system. In such manner, the positioning of the base surface may be determined.

Yet another step may comprise determining the spatial position and/or orientation of the tool, positioning system, robot, machine, or device relative to the base surface. This may be accomplished through the use of one or more computers which may make calculations based on the data received from the targets and on the data received from the calibration apparatus. Another step may comprise moving the tool, positioning system, robot, machine, or device into one or more additional predetermined locations. For instance, in one embodiment, the tool, positioning system, robot, machine, or device may be moved into four different maximum movement positions in each of forward, center, and aft locations. This may allow the tool, positioning system, robot, machine, or device to be calibrated relative to the surface in a multitude of locations. Additional steps may comprise emitting one or more laser beams from a laser tracking system towards the additional predetermined locations, determining the spatial location and/or orientation of the calibration apparatus in the additional predetermined locations, and determining the spatial location and/or orientation of the tool, positioning system, robot, machine, or device based on the determined spatial location and/or orientation of the calibration apparatus in the additional predetermined locations. In such manner, the tool, positioning system, robot, machine, or device may be calibrated in each of the predetermined locations.

One or more embodiments of the disclosed calibrating apparatus and/or methods of the invention may solve one or more problems in existing calibrating tools, positioning systems, robots, machines, or other devices. In such manner, the invention may improve accuracy, timeliness, cost, repeatability, failure breakdown, ease of use, and/or other additional calibrating problems.

It should be understood, of course, that the foregoing relates to exemplary embodiments of the invention and that modifications may be made without departing from the spirit and scope of the invention as set forth in the following claims.

We claim:

1. A method for determining the spatial location and orientation of at least one of a tool, positioning system, robot, machine, and device the method comprising:
   providing a calibration apparatus having only two reflectors in known positions;
   attaching the calibration apparatus to at least one of a tool, positioning system, robot, machine, and device by aligning a center-line of the calibration apparatus with a center-line of a portion of said at least one tool, positioning system, robot, machine, and device;
   using a laser tracking system to determine spatial X, Y, and Z coordinates of said only two reflectors;
   using the spatial X, Y, and Z coordinates of said only two reflectors to determine angular orientation of said calibration apparatus;
   determining spatial location and orientation of said at least one tool, positioning system, robot, machine, and device based on said determined spatial X, Y, and Z coordinates of said only two reflectors and said determined angular orientation of said calibration apparatus; and
   using said determined spatial location and orientation of said at least one tool, positioning system, robot, machine, and device to at least one of calibrate said at least one tool, positioning system, robot, machine, and device, and manufacture a surface.

2. The method of claim 1 wherein the step of providing a calibration apparatus comprises providing a calibration apparatus having a first member with said only two reflectors in known positions.

3. The method of claim 2 wherein said only two reflectors are aligned along a center-line of said first member.

4. The method of claim 1 wherein said only two reflectors comprise at least one of substantially spherical and substantially hemi-spherical reflectors.

5. The method of claim 1 wherein a diameter of said only two reflectors is substantially in the range of one-half inch to two inches.

6. The method of claim 1 wherein said only two reflectors comprise one or more mirrors.

7. The method of claim 1 wherein the step of attaching the calibration apparatus to at least one of a tool, positioning system, robot, machine, and device comprises aligning the center-line of the calibration apparatus with a center-line of a spindle of a milling machine.

8. The method of claim 1 wherein the step of attaching the calibration apparatus to at least one of a tool, positioning system, robot, machine, and device comprises attaching one or more indexing diameters of said calibration apparatus to at least one of a tool, positioning system, robot, machine, and device.

9. The method of claim 1 wherein the step of using a laser tracking system to determine spatial X, Y, and Z coordinates of said only two reflectors comprises emitting at least one laser beam from said laser tracking system, reflecting said at least one laser beam off said only two reflectors, and determining spatial X, Y, and Z coordinates of said only two reflectors utilizing at least one computer.

10. The method of claim 1 wherein the step of using the spatial X, Y, and Z coordinates of said only two reflectors to determine angular orientation of said calibration apparatus comprises utilizing at least one computer to compute the angular orientation of said calibration apparatus.

11. The method of claim 1 further comprising the step of moving said at least one tool, positioning system, robot, machine, and device into a plurality of positions, using the laser tracking system to determine spatial X, Y, and Z coordinates of said only two reflectors in each of said plurality of positions, and using the spatial X, Y, and Z coordinates of said only two reflectors in each of said plurality of positions to determine angular orientation of said calibration apparatus in each of said positions.

12. The method of claim 11 further comprising the step of determining the spatial location and orientation of said at least one tool, positioning system, robot, machine, and device in said plurality of positions based on said determined spatial X, Y, and Z coordinates of said only two reflectors in each of said plurality of positions and based on said determined angular orientation of said calibration apparatus in each of said positions.

13. The method of claim 1 wherein the calibration apparatus is utilized for determining the spatial location and orientation of at least one tool, positioning system, robot, machine, and device for manufacturing one or more portions of an airplane.

14. The method of claim 1 wherein the step of attaching the calibration apparatus to at least one of a tool, positioning system, robot, machine, and device comprises attaching said calibration apparatus to an end effector of at least one of a tool, positioning system, robot, machine, and device.

15. The method of claim 14 further comprising the steps of determining the spatial X, Y, and Z coordinates and angular orientation of said end effector using said determined spatial X, Y, and Z coordinates of said only two reflectors and said determined angular orientation of said calibration apparatus.

16. The method of claim 15 further comprising the step of readjusting at least one of a position and orientation of said end effector based on the determined spatial X, Y, and Z coordinates and angular orientation of said end effector.

17. The method of claim 16 further comprising the step of using the readjusted end effector to machine a hole.

18. A method for determining at least one of the spatial location and orientation of at least one of a tool, positioning system, robot, machine, and device, the method comprising:
providing a calibration apparatus having only two reflectors in known positions;
attaching the calibration apparatus to at least one of a tool, positioning system, robot, machine, and device;
moving said at least one tool, positioning system, robot, machine, and device to a first predetermined location;
emitting one or more laser beams from a laser tracking system towards said first predetermined location;
determining at least one of the spatial location and orientation of said calibration apparatus in said first predetermined location; and
determining at least one of the spatial location and orientation of said at least one tool, positioning system, robot, machine, and device based on said at least one determined spatial location and orientation of said calibration apparatus in said first predetermined location; and
using said at least one determined spatial location and orientation of said at least one tool, positioning system, robot, machine, and device to at least one of calibrate said at least one tool, positioning system, robot, machine, and device, and manufacture a surface.

19. The method of claim 18 wherein the steps of moving said at least one tool, positioning system, robot, machine, and device to said first predetermined location, and emitting one or more laser beams from a laser tracking system towards said first predetermined location are accomplished utilizing at least one computer which ensures that both steps take place at least one of interactively and simultaneously.

20. The method of claim 18 further comprising the step of placing a plurality of laser targets on various portions of a base surface upon which said at least one tool, positioning system, robot, machine, and device are located.

21. The method of claim 20 further comprising the step of determining X, Y, and Z spatial positions of said plurality of laser targets using said laser tracking system.

22. The method of claim 21 further comprising determining at least one of the spatial position and orientation of said at least one tool, positioning system, robot, machine, and device relative to said base surface utilizing at least one computer.

23. The method of claim 18 further comprising the step of moving said at least one tool, positioning system, robot, machine, and device to one or more additional predetermined locations.

24. The method of claim 23 further comprising the steps of emitting one or more laser beams from a laser tracking system towards said one or more additional predetermined locations, determining at least one of the spatial location and orientation of said calibration apparatus in said one or more additional predetermined locations, and determining at least one of the spatial location and orientation of said at least one tool, positioning system, robot, machine, and device based on said at least one determined spatial location and orientation of said calibration apparatus in said one or more additional predetermined locations.

25. A method for determining the spatial location and orientation of at least one of a tool, positioning system, robot, machine, and device the method comprising:
providing a calibration apparatus having only two reflectors in known positions;
attaching the calibration apparatus to at least one of a tool, positioning system, robot, machine, and device;
moving said at least one tool, positioning system, robot, machine, and device into a plurality of positions and using a laser tracking system to determine spatial X, Y, and Z coordinates of said only two reflectors in each of said plurality of positions;
using the spatial X, Y, and Z coordinates of said only two reflectors in each of said plurality of positions to determine angular orientation of said calibration apparatus in each of said positions;
determining spatial location and orientation of said at least one tool, positioning system, robot, machine, and device based on said determined spatial X, Y, and Z coordinates of said only two reflectors and said determined angular orientation of said calibration apparatus; and
using said determined spatial location and orientation of said at least one tool, positioning system, robot, machine, and device to at least one of calibrate said at least one tool, positioning system, robot, machine, and device, and manufacture a surface.

26. The method of claim 25 wherein the step of providing a calibration apparatus comprises providing a calibration apparatus having a first member with said only two reflectors in known positions.

27. The method of claim 26 wherein said only two reflectors are aligned along a center-line of said first member.

28. The method of claim 25 wherein said only two reflectors comprise at least one of substantially spherical and substantially hemi-spherical reflectors.

29. The method of claim 25 wherein a diameter of said only two reflectors is substantially in the range of one-half inch to two inches.

30. The method of claim 25 wherein said only two reflectors comprise one or more mirrors.

31. The method of claim 25 wherein the step of attaching the calibration apparatus to at least one of a tool, positioning system, robot, machine, and device comprises aligning a center-line of the calibration apparatus with a center-line of a portion of at least one tool, positioning system, robot, machine, and device.

32. The method of claim 31 wherein the step of attaching the calibration apparatus to at least one of a tool, positioning system, robot, machine, and device comprises aligning a center-line of the calibration apparatus with a center-line of a spindle of a milling machine.

33. The method of claim 25 wherein the step of attaching the calibration apparatus to at least one of a tool, positioning system, robot, machine, and device comprises attaching one or more indexing diameters of said calibration apparatus to at least one of a tool, positioning system, robot, machine, and device.

34. The method of claim 25 wherein the step of using a laser tracking system to determine spatial X, Y, and Z coordinates of said only two reflectors comprises emitting at least one laser beam from said laser tracking system, reflecting said at least one laser beam off said only two reflectors, and determining spatial X, Y, and Z coordinates of said only two reflectors utilizing at least one computer.

35. The method of claim 25 wherein the step of using the spatial X, Y, and Z coordinates of said only two reflectors to determine angular orientation of said calibration apparatus comprises utilizing at least one computer to compute the angular orientation of said calibration apparatus.

36. The method of claim 25 further comprising the step of determining the spatial location and orientation of said at least one tool, positioning system, robot, machine, and device in said plurality of positions based on said determined spatial X, Y, and Z coordinates of said only two reflectors in each of said plurality of positions and based on said determined angular orientation of said calibration apparatus in each of said positions.

37. The method of claim 25 wherein the calibration apparatus is utilized for determining the spatial location and orientation of at least one tool, positioning system, robot, machine, and device for manufacturing one or more portions of an airplane.

38. The method of claim 25 wherein the step of attaching the calibration apparatus to at least one of a tool, positioning system, robot, machine, and device comprises attaching said calibration apparatus to an end effector of at least one of a tool, positioning system, robot, machine, and device.

39. The method of claim 38 further comprising the steps of determining the spatial X, Y, and Z coordinates and angular orientation of said end effector using said determined spatial X, Y, and Z coordinates of said only two reflectors and said determined angular orientation of said calibration apparatus.

40. The method of claim 39 further comprising the step of readjusting at least one of a position and orientation of said end effector based on the determined spatial X, Y, and Z coordinates and angular orientation of said end effector.

41. The method of claim 40 further comprising the step of using the readjusted end effector to machine a hole.

42. A method for determining the spatial location and orientation of at least one of a tool, positioning system, robot, machine, and device the method comprising:
    providing a calibration apparatus having only two reflectors in known positions;
    attaching the calibration apparatus to an end effector of at least one of a tool, positioning system, robot, machine, and device;
    using a laser tracking system to determine spatial X, Y, and Z coordinates of said only two reflectors;
    using the spatial X, Y, and Z coordinates of said only two reflectors to determine angular orientation of said calibration apparatus;
    determining spatial location and orientation of said end effector of said at least one tool, positioning system, robot, machine, and device based on said determined spatial X, Y, and Z coordinates of said only two reflectors and said determined angular orientation of said calibration apparatus; and
    using said determined spatial location and orientation of said end effector of said at least one tool, positioning system, robot, machine, and device to at least one of calibrate said at least one tool, positioning system, robot, machine, and device, and manufacture a surface.

43. The method of claim 42 wherein the step of providing a calibration apparatus comprises providing a calibration apparatus having a first member with said only two reflectors in known positions.

44. The method of claim 43 wherein said only two reflectors are aligned along a center-line of said first member.

45. The method of claim 42 wherein said only two reflectors comprise at least one of substantially spherical and substantially hemi-spherical reflectors.

46. The method of claim 42 wherein a diameter of said only two reflectors is substantially in the range of one-half inch to two inches.

47. The method of claim 42 wherein said only two reflectors comprise one or more mirrors.

48. The method of claim 42 wherein the step of attaching the calibration apparatus to at least one of a tool, positioning system, robot, machine, and device comprises aligning a center-line of the calibration apparatus with a center-line of a portion of at least one tool, positioning system, robot, machine, and device.

49. The method of claim 48 wherein the step of attaching the calibration apparatus to at least one of a tool, positioning system, robot, machine, and device comprises aligning a center-line of the calibration apparatus with a center-line of a spindle of a milling machine.

50. The method of claim 42 wherein the step of attaching the calibration apparatus to at least one of a tool, positioning system, robot, machine, and device comprises attaching one or more indexing diameters of said calibration apparatus to at least one of a tool, positioning system, robot, machine, and device.

51. The method of claim 42 wherein the step of using a laser tracking system to determine spatial X, Y, and Z coordinates of said only two reflectors comprises emitting at least one laser beam from said laser tracking system, reflecting said at least one laser beam off said only two reflectors, and determining spatial X, Y, and Z coordinates of said only two reflectors utilizing at least one computer.

52. The method of claim 42 wherein the step of using the spatial X, Y, and Z coordinates of said only two reflectors to determine angular orientation of said calibration apparatus comprises utilizing at least one computer to compute the angular orientation of said calibration apparatus.

53. The method of claim 42 further comprising the step of moving said at least one tool, positioning system, robot, machine, and device into a plurality of positions, using the laser tracking system to determine spatial X, Y, and Z coordinates of said only two reflectors in each of said plurality of positions, and using the spatial X, Y, and Z coordinates of said only two reflectors in each of said plurality of positions to determine angular orientation of said calibration apparatus in each of said positions.

54. The method of claim 53 further comprising the step of determining the spatial location and orientation of said at least one tool, positioning system, robot, machine, and device in said plurality of positions based on said determined spatial X, Y, and Z coordinates of said only two reflectors in each of said plurality of positions and based on said determined angular orientation of said calibration apparatus in each of said positions.

55. The method of claim 42 wherein the calibration apparatus is utilized for determining the spatial location and orientation of at least one tool, positioning system, robot, machine, and device for manufacturing one or more portions of an airplane.

56. The method of claim 42 further comprising the step of readjusting at least one of a position and orientation of said end effector based on the determined spatial X, Y, and Z coordinates and angular orientation of said end effector.

57. The method of claim 56 further comprising the step of using the readjusted end effector to machine a hole.

* * * * *